Dec. 20, 1966   L. P. HORWITZ ETAL   3,293,452
RELATIVE MAGNITUDE DETECTOR
Filed Oct. 22, 1963   2 Sheets-Sheet 1

INVENTORS
LAWRENCE P. HORWITZ
OTTO MOND
BY Francis J. Thomas
ATTORNEY

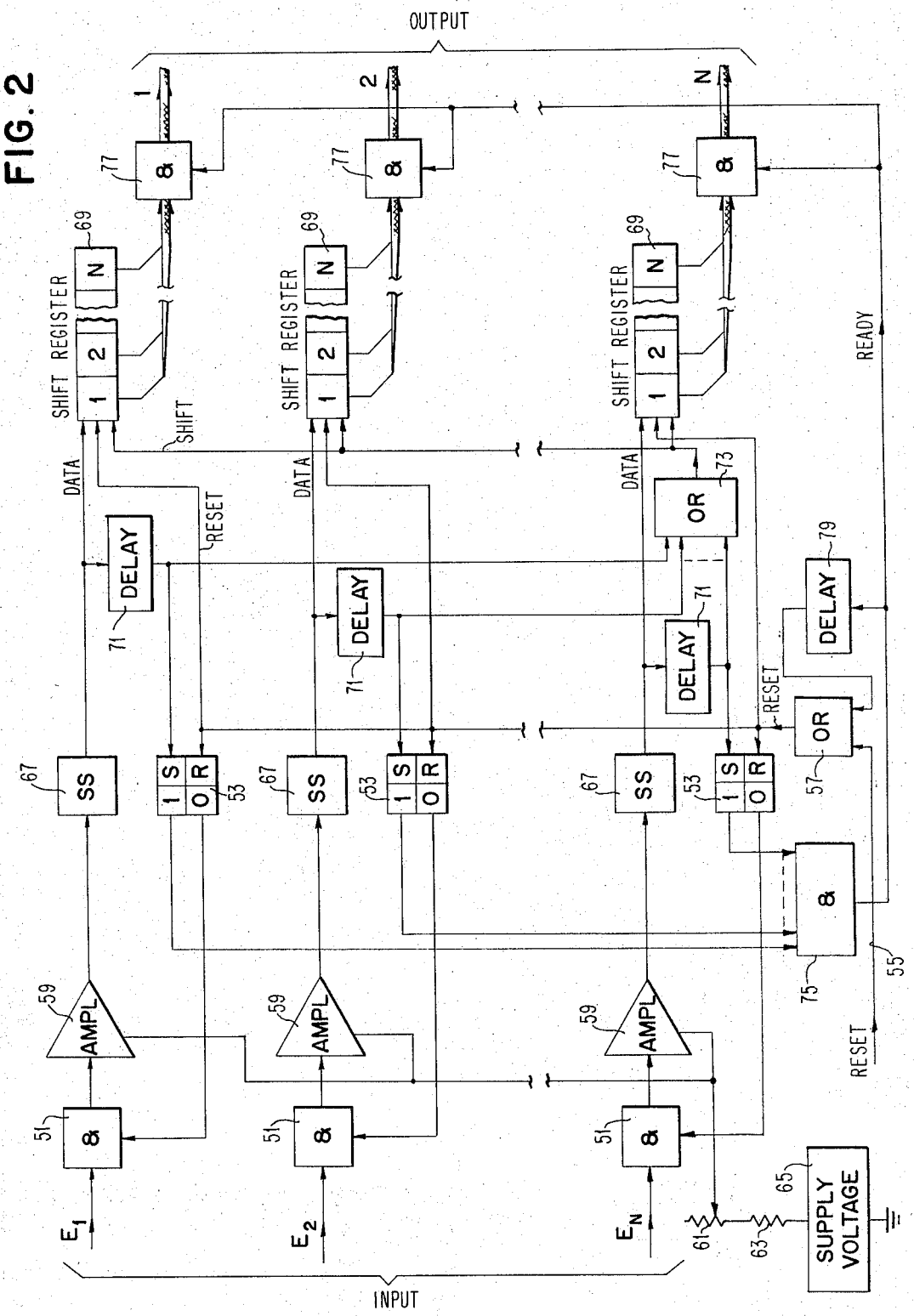

United States Patent Office

3,293,452
Patented Dec. 20, 1966

3,293,452
RELATIVE MAGNITUDE DETECTOR
Lawrence P. Horwitz, Chappaqua, and Otto Mond, White Plains, N.Y., assignors to International Business Machines Corporation, New York, N.Y., a corporation of New York
Filed Oct. 22, 1963, Ser. No. 317,966
11 Claims. (Cl. 307—88.5)

This invention relates to a system which provides an indication of the relative magnitude of a group of signals.

A circuit for providing an indication of the largest or smallest of a group of applied signals is shown and described in a U.S. patent application, by Jose Reines, Serial Number 86,753, now Patent No. 3,228,002, filed on February 2, 1961 and entitled Extreme Signal Indicator. The present invention utilizes part of the teaching in that application with additional circuitry to provide an indication of the relative magnitude of all of the applied signals. The present invention is suitable for use in conjunction with computing devices and, in particular, for use in recognition systems of the type wherein the degree of match between the pattern to be recognized and a group of reference patterns is indicated by a group of analog voltages. In this case, the present invention enables the best match to be detected while also providing an indication of the second-best match, the third-best match, etc., for error correcting and other purposes. The invention is also useful as an analog-to-digital converter for general computing uses.

It is thus an object of the present invention to provide a system which responds to a group of input signals to provide an indication of the relative magnitude of the signals.

Another object of the present invention is to provide a system which responds to a plurality of analog voltages to provide an indication of the largest and smallest of these voltages as well as an indication of the relative magnitude of the other applied voltages.

A further object is to provide an analog-to-digital converting system which responds to a plurality of analog voltages to provide digital indications of the relative magnitudes of the voltages.

The foregoing and other objects, features and advantages of the invention will be apparent from the following more particular description of preferred embodiments of the invention, as illustrated in the accompanying drawings.

In the drawings:

FIG. 2 is a detailed diagram of a second preferred embodiment of the invention.

Figure 1:
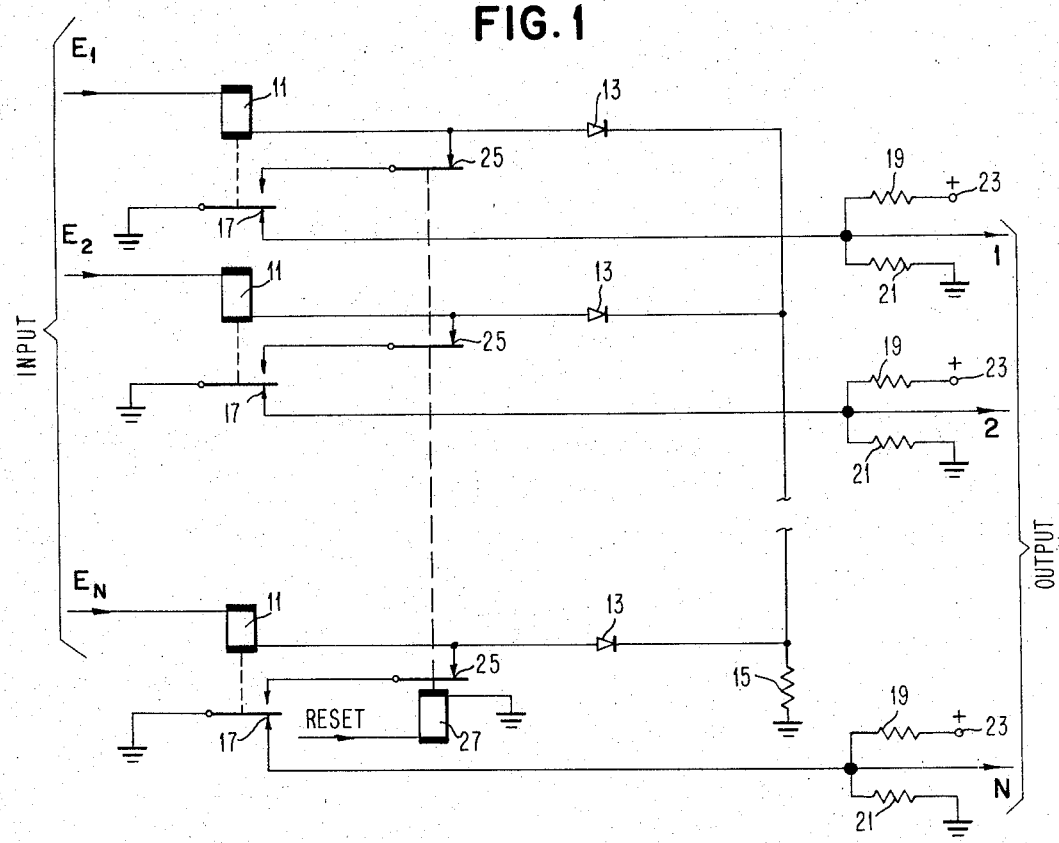
FIG. 1 is a schematic diagram of a first preferred embodiment of the invention.

The invention is embodied in FIG. 1, wherein each of a group of positive analog voltages $E_1, E_2, \ldots, E_n$ is applied to a circuit containing a relay 11, a diode 13 and a common resistor 15. The largest positive voltage causes a sufficient current to flow through the corresponding relay and diode to develop a voltage across the common resistor. Since the impedance of the relay coil and diode is relatively insignificant when compared to the impedance (resistance) of the resistor, almost the entire applied voltage appears across the resistor. This voltage back-biases the diodes in all circuits except for the circuit to which the voltage is applied. In this manner, current initially flows through only one relay—the relay corresponding to the largest applied voltage. This relay alone is activated and its contacts 17 perform two functions: first, the grounding signal is removed from the normally-closed contact which changes the corresponding output voltage from zero volts to a positive voltage as determined by the values of resistors 19 and 21 and a source voltage applied at terminal 23; and second, a grounding signal is applied through the normally-open contacts of relay 11 and normally-closed contacts 25 of a reset relay 27 to the right side of the corresponding relay 11. Thus, the largest applied signal causes an output signal to be produced and provides a current path for the signal which bypasses the diode 13 and common resistor 15. As soon as the alternate current path is provided, the back-biasing voltage is terminated and the second-highest voltage causes current to flow through its corresponding relay 11 and diode 13 to develop a voltage across resistor 15 which, in turn, back-biases the diodes in the circuits to which the lower amplitude voltages are applied. The operation of the relay 11 in the circuit corresponding to the second-highest voltage now causes an output voltage to appear on the corresponding output lead and grounds the right side of the relay. In a similar manner, all relays 11 are activated with a sequence corresponding to the relative magnitudes of the applied voltages.

A reset signal is applied to activate relay 27 before repeating the operation on another group of input voltages. When the relay contacts 25 open, the grounding voltages are removed from the right side of relays 11 and the above cycle can be repeated.

Since the common resistor 15 is connected to ground potential, and because of the diode connections, the circuits operate on positive voltages only. The operating range can be extended by connecting this resistor to a negative source—in this case, the circuit operates in sequence starting with the circuit to which the most positive (or least negative) voltage is applied. The diodes 13 can be reversed to cause the circuits to indicate the relative magnitude of applied negative voltages. In addition to reversing the diodes, the common resistor 15 can be connected to a positive source rather than ground to extend the range of input voltages to include positive voltages— in this case the circuits operate in sequence from the circuit to which the most negative (or least positive) voltage is applied.

The sensitivity of the circuit is determined by the impedance of the relays 11 and diodes 13 as compared to the impedance of the common resistor 15, where sensitivity can be increased by increasing the ohmic value of the common resistor 15. When the sensitivity is relatively low and the applied voltages are not substantially different, two or more relays are activated concurrently. This feature can be useful because the simultaneous appearance of two or more output signals can be used as an indication that the corresponding applied voltages are approximately equal (differ from each other within a predetermined range).

The inventive concept that is embodied in FIG. 1 is extended in FIG. 2 to a preferred embodiment that has increased sensitivity and speed and includes output storage circuits.

Figure 3:
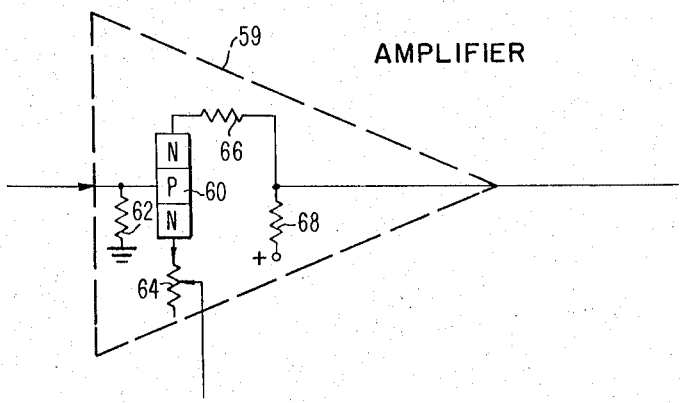
FIG. 3 is a schematic diagram of an amplifier circuit that is suitable for use in the embodiment of FIG. 2.

In FIG. 2, the input signals are applied to "and" gates 51 which are controlled by bistable devices 53. Prior to the first operation, an input reset signal is applied on a lead 55 through an "or" gate 57 the the reset (R) input of the bistable devices. When reset, the bistable devices generate signals at their "0" outputs which condition all "and" gates 51. The "and" gates pass the input voltages to a group of amplifiers 59. The amplifiers, which are shown in detail in FIG. 3, contain a transistor 60 and several resistors 62, 64, 66, 68. The input signal is applied across resistor 62 to the base connection of the transistor. The emitter is connected to variable resistor 64 and the collector current flows through resistors 66 and 68. The emitter-base diode appears between the lower and left connections to the triangular symbol and an output is supplied at the right apex of this symbol. The emitter-base diodes function in the same manner as the diodes in the embodiment of FIG. 1, operating in conjunction with a voltage source 65 and a common resistance comprising a variable resistor 61 (FIG. 2) and a resistor 63. That is, the largest applied positive signal develops a positive voltage at the tap on resistor 61 which back-biases the other emitter-diodes in amplifiers 59. The voltage supply 65 is omitted when the circuit is to respond only to positive voltages. The use of a negative supply extends the range of the circuits to include negative voltages as described with respect to FIG. 1. The amplifier corresponding to the largest applied voltage produces an output voltage which triggers a single-shot multivibrator 67. The pulse generated by the triggered single-shot is applied at the "data" input to the lowest-order position of a corresponding shift register 69. The shift registers are initially reset by the signal from "or" gate 57. The pulse from the triggered single-shot 67 is delayed for a short time (in the order of one microsecond) by a delay circuit 71 and applied to the set (S) input of the corresponding bistable device 53. The conditioning signal from the "0" output of this bistable device is thus removed from the corresponding "and" gate 51 and the input signal which initiated the above operation is blocked by the "and" gate. The pulse from delay 71 is also applied through an "or" gate 73 as the "shift" input to all shift registers 69. In this manner, the shift register corresponding to the largest applied voltage contains a data element in its second position and all other shift registers are unaffected.

The sensitivity of the circuits is dependent upon many factors, including the impedance of "and" gates 51, the emitter-base diodes in amplifiers 59 (including emitter and base resistors), and resistors 61, 63, where the sensitivity can be varied by adjusting variable resistor 61. (Greater sensitivity is achieved by increasing the value of resistor 61.) The ohmic values of variable resistors 64 (FIG. 3) are altered to compensate for alterations of variable resistors 61 (FIG. 2) to maintain a constant emitter impedance. All resistors can be mounted on a common shaft to facilitate their adjustment. When two or more applied voltages are almost equal (within the sensitivity of the circuits), the data is simultaneously applied to two or more corresponding shift registers.

The above-described operation is repeated on the remaining voltages. During each cycle of operation, the highest remaining voltage is sensed, data is applied to the lowest-order position of the corresponding shift register, the data in all shift registers is shifted, the corresponding bistable device is set, and the corresponding "and" gate 51 is blocked. Finally, all input signals are sensed and the shift registers are filled with data. If each applied voltage differs from the other applied voltage by an amount greater than the minimum established by the sensitivity of the system (the setting of potentiometer 61), each shift register contains one data element and the element is in a different position than the data elements in all other shift registers. The shift register containing a data element in its highest-order (N) position corresponds to the largest applied voltage, and the shift registers with data elements in successively-lower-order positions correspond to the smaller applied voltages according to their relative order of magnitude. When two or more voltages cause simultaneous operation (because they are almost equal) no data element reaches the highest-order (N) position of a shift register and two or more shift registers contain a data element at the same position. In any event, only one data element is present in each shift register.

At the termination of the cycle, all bistable devices 53 have been set and their "1" outputs condition an "and" gate 75 which provides a "ready" signal to a group of multiple "and" gates 77. Each multiple "and" gates 77 contains N "and" gates, each of which is conditioned by the "ready" signal from "and" gate 75. Each N-lead output cable from "and" gates 77 contains one lead with a signal which indicates the position of the data element in the corresponding shift register. The remaining (N−1) leads in each output cable contain no signals.

The system is automatically reset after the conditioning of "and" gates 77 by the application of the "ready" signal from "and" gate 75 through a delay circuit 79 (with a delay in the order of one microsecond) and through "or" gate 57.

The circuit in FIG. 2 provides an indication of the relative magnitude of the applied voltages, where the most positive voltage takes precedence. As described with respect to FIG. 1, the operation can be reversed by reverse-connecting the diodes. In FIG. 2 this is accomplished by replacing the NPN transistors with PNP transistors and making the conventional changes in supply voltages. Similarly, the range of the circuits can be extended by the use of a voltage supply 65 in the manner described above.

The relative magnitude detectors that have been shown and described respond to a group of applied analog signals and provide an indication of the relative magnitudes of the signals. While the invention has been partciularly shown and described with reference to preferred embodiments thereof, it will be understood by those skilled in the art that various changes in form and details may be made therein without departing from the spirit and scope of the invention.

What is claimed is:

1. An apparatus for providing an indication of the relative magnitude of a plurality of input signals comprising, in combination:

a plurality of current paths, each responsive to an input signal, and each comprising an asymmetrically-conducting impedance and a thresholded switching device for providing an output when a predetermined magnitude of current is exceeded;

another current path, including a common impedance, controllably responsive to the current in each of said current paths for generating a back-biasing signal to cause the asymmetrically-conducting impedance in all controlling current paths, except for the controlling current path to which the largest input signal is applied, to hinder the flow of current in said paths;

and a plurality of means, each responsive to an output generated by a thresholded, current-sensitive switching device for controlling the current paths to inhibit the effect of the corresponding input signal on the common impedance when the threshold of the switching device is exceeded;

a plurality of indicating means responsive to the switching means for indicating the relative magnitude of the input signal;

whereby each of the applied input signals causes the corresponding threshold device to be activated in the sequence determined by the relative magnitudes of the applied input signals.

2. The apparatus described in claim 1, wherein the asymmetrically-conducting impedances conduct current in one direction only.

3. The apparatus described in claim 1, wherein the asymmetrically-conducting impedances are diodes.

4. The apparatus described in claim 1, wherein the asymmetrically-conducting impedances are the emitter-base diodes of transistors.

5. The apparatus described in claim 1, wherein the thresholded current-sensitive switching devices are relays.

6. The apparatus described in claim 1, wherein the thresholded current-sensitive switching devices comprise bistable devices.

7. The apparatus described in claim 6, wherein the bistable devices are relays.

8. The apparatus described in claim 6, wherein the bistable devices are electronic multivibrators.

9. The apparatus described in claim 1, wherein the means for removing the effect of the corresponding input signals on the common impedance are electronic gates.

10. The apparatus described in claim 1, where the means for removing the effect of the corresponding input signals on the common impedance are low-resistance circuits to detour the current away from the common impedance.

11. A circuit comprising, in combination:
a plurality of current paths, each comprising the emitter-base diode of a transistor;
a plurality of gates, responsive to an input signal and to a bistable circuit means, each of said gates applying an input signal to a current path;
a common current path, comprising a common impedance, connected in series with all of said current paths;
a plurality of switching means, each responsive to the current in an emitter-base diode for providing an output signal;
a plurality of bistable circuit means responsive to the plurality of switching means for providing an output signal to said gates;
a plurality of shift registers, each for storing an output signal from one of the switching means;
means for shifting the data in all shift registers when any of the plurality of switching means provides an output signal;
and a plurality of gating means responsive to said shift registers for providing an output indicative of the information in each of said shift registers;
whereby the output of said plurality of gating means provides an indication of the relative magnitudes of the plurality of input signals.

References Cited by the Examiner

UNITED STATES PATENTS

| | | | |
|---|---|---|---|
| 2,966,672 | 12/1960 | Horn | 340—149 X |
| 2,974,286 | 3/1961 | Meyer | 328—116 |
| 3,092,732 | 6/1963 | Milford | 307—88.5 |
| 3,125,721 | 3/1964 | Schumann | 328—147 X |
| 3,166,679 | 1/1965 | Paufve | 307—88.5 |
| 3,173,127 | 3/1965 | Brunner | 340—149 X |

MILTON O. HIRSHFIELD, *Primary Examiner.*

LEE T. HIX, *Examiner.*

D. YUSKO, J. SILVERMAN, *Assistant Examiners.*